Sept. 10, 1929.  C. A. HOLGERSSON  1727,829
FLOUR SIFTER
Filed March 18, 1927
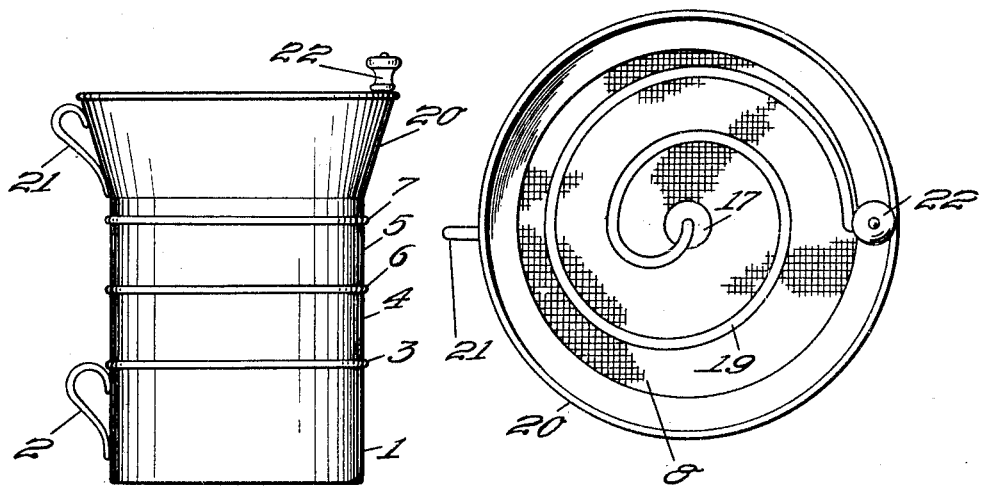
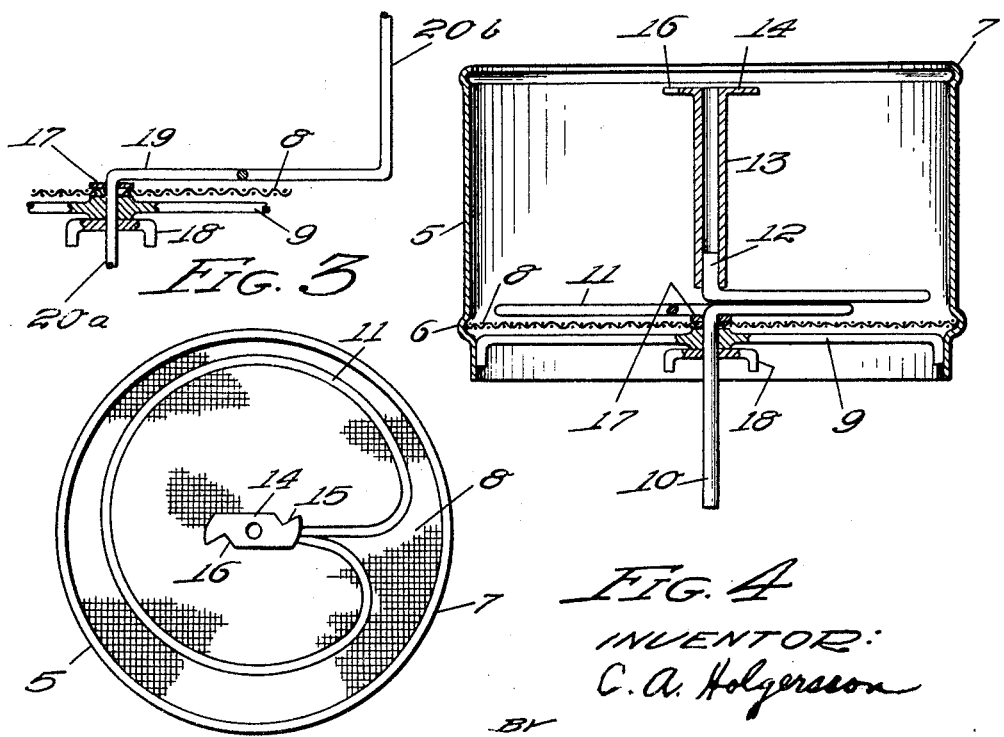

Patented Sept. 10, 1929.

1,727,829

UNITED STATES PATENT OFFICE.

CARL A. HOLGERSSON, OF CHICAGO, ILLINOIS.

FLOUR SIFTER.

Application filed March 18, 1927. Serial No. 176,497.

This invention relates to improvements in sifters and more particularly to flour sifters and its chief object is to provide a simple practical device of this kind that is efficient in operation, substantial in construction and cheap to manufacture.

With the foregoing and other objects in view the invention consists in the combination and arrangement of parts to be hereinafter fully described, pointed out in the claims and illustrated in the accompanying drawing which forms a part of this application and in which—

Fig. 1 is a view of the sifter in side elevation.

Fig. 2 is a top plan view thereof.

Fig. 3 is an enlarged fragmentary sectional view of Fig. 2 illustrating the structural assembly.

Fig. 4 is a vertical sectional view through Fig. 5.

Fig. 5 is a top plan view of Fig. 4.

Like reference characters denote corresponding parts throughout the several views.

The present invention sets forth a sifter that will sift flour or other fine material several times in one operation and that will serve to thoroughly mix flour, baking powder, and other like ingredients at the same time if desired.

The sifter is of sectional construction and may comprise any number of sections that are easily and readily assembled or taken apart and that, in assembly, are so constructed and adapted to each other that they operate as a unit.

The sifter comprises the cup or receptacle 1 provided with the handle 2 and formed with the bead 3 and adapted to receive the section 4 which is open at both ends and similar in all respects to the section 5, which section 4 in turn receives, and a description therefore of section 4 will suffice also for section 5.

Each of said sections 4 and 5 is formed with a lower bead 6 and an upper bead 7 and is provided with a transverse wire screen 8 the periphery of which is disposed, or secured in, the bead 6 and directly beneath said screen is a transverse brace 9 through the center of which the depending prong 10 of a substantially heart shaped agitator 11 extends, in the section 5, one end 12 of said agitator being firmly secured in one end of the sleeve 13 the upper end of which is formed with the oblong flange 14 in which the diagonally opposed notches 15, 16 are formed. The said prong 10 passes also through the center of the screen 8 and is provided with a washer 17 and below the brace 9 with a pronged lug 18, fast thereto, adapted to engage with the notches 15, 16 of the lug 14 in the section 4.

A coiled agitator 19 arranged in the top section 20, provided with the handle 21, is formed with a depending prong 20ª adapted for frictional engagement with the sleeve 13 in the section 5, said section 20 being provided also with a screen 8; one end 20ᵇ of said agitator 19 being extended upwardly and provided with a knob 22. The flour or other material to be mixed or sifted is introduced into the top section 20 and the handle 22 rotated thus causing the agitators 19, 11 to revolve and to agitate, sift, re-sift and mix the same and finally to deposit it in the cup 1 ready for use.

What is claimed is:—

1. In a flour sifter, a plurality of interfitting members, each member forming a compartment, screens in all but one of said compartments, transverse braces in said compartments beneath said screens, a coiled agitator in one compartment adapted for rotary movement directly above one screen, one end of said agitator forming a downwardly extending prong extending through one of said transverse braces into the next compartment, the other end extending upwardly and being provided with a handle, a lug fast to the downturned end of said agitator, a flanged sleeve in said last named compartment, the flange of said sleeve being notched to receive said lug, a heart-shaped agitator arranged in said compartment and having one upturned end receiving said flanged sleeve, said agitator rotating directly above a second screen and having a downturned prong extending through a second transverse brace into a third compartment, a flanged sleeve therein receiving said prong and engaging the flanged portion of said sleeve, and handles for the terminal compartments.

2. In a flour sifter of the class described, a plurality of superposed members forming compartments, each member being notched adjacent its lower end and beaded at its upper end, a screen fitted within the notched lower end of each of said members, a coiled agitator in one of said compartments adapted for rotary movement directly above one of said screens, one end of said agitator forming a downwardly extending prong extending into the next lower compartment, a double pronged lug secured to the down turned end of said agitator, a sleeve located in the next lower compartment receiving the down turned end of said agitator, a flange at the upper end of said sleeve provided with a pair of oppositely faced notches receiving therein the prongs of the aforesaid lug and means for manually rotating said agitator and adjunctive parts, as and for the purposes described.

In testimony that I claim the foregoing as my own I have hereto affixed my signature.

CARL A. HOLGERSSON.